United States Patent [19]
Krumm

[11] Patent Number: 5,536,208
[45] Date of Patent: Jul. 16, 1996

[54] APPARATUS FOR DAMPING VIBRATIONS IN POWER TRAINS OF MOTOR VEHICLES

[75] Inventor: Klaus-Dieter Krumm, Sinzheim, Germany

[73] Assignee: LuK Lamellen und Kupplungsbau GmbH, Bühl, Germany

[21] Appl. No.: 195,101

[22] Filed: May 16, 1988

[30] Foreign Application Priority Data

May 21, 1987 [DE] Germany ............... 37 17 100.3
Feb. 9, 1988 [DE] Germany ............... 38 03 847.1

[51] Int. Cl.$^6$ ............... F16D 3/80; F16F 15/12
[52] U.S. Cl. ............... 464/68; 464/24
[58] Field of Search ............... 74/574; 192/106.2; 464/24, 64, 66, 68

[56] References Cited

U.S. PATENT DOCUMENTS

| | | | |
|---|---|---|---|
| 1,240,126 | 9/1917 | Dubois | 464/66 X |
| 4,440,283 | 4/1984 | Nioloux | 464/68 X |
| 4,723,463 | 2/1988 | Reik et al. | 74/574 |
| 4,727,970 | 3/1988 | Reik et al. | 464/68 X |
| 4,739,866 | 4/1988 | Reik et al. | 464/24 X |
| 4,782,718 | 11/1988 | Hartig et al. | 192/106.2 X |

OTHER PUBLICATIONS

"The Two-Mass Flywheel-A Torsional Vibration Damper for the Power Train of Passenger Cars-State of the Art and Further Technical Development", SAE Technical Paper Series #870394, Sebulke, pp. 1–10, Feb. 1987.

*Primary Examiner*—Daniel P. Stodola
*Attorney, Agent, or Firm*—Darby & Darby

[57] ABSTRACT

Apparatus for damping vibrations in the power train between the engine and the transmission of an automobile has a first flywheel connectable to the crankshaft of the engine, a second flywheel connectable to the input shaft of the transmission by a friction clutch, and at least one damper between the flywheels. The damper has a twin-section output element which is axially movably secured to the second flywheel by a toothed coupling and is biased by coil springs which react against the first flywheel. The sections of the output element are biased in opposite directions by at least one of the coil springs or by one or more additional coil springs so that the teeth of the coupling mate without play, at least under no-load or partial-load operating conditions in the neutral position of the damper.

11 Claims, 4 Drawing Sheets

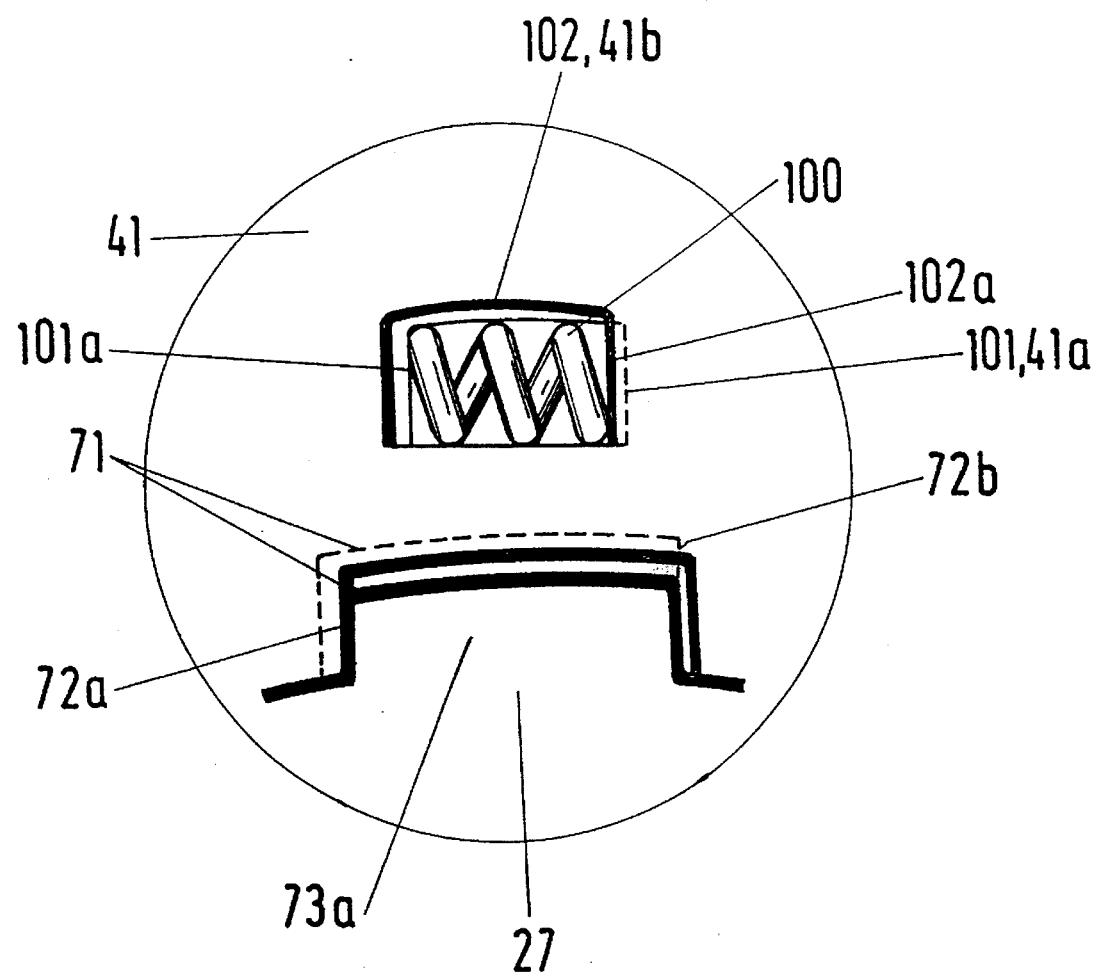

APPARATUS FOR DAMPING VIBRATIONS IN POWER TRAINS OF MOTOR VEHICLES

BACKGROUND OF THE INVENTION

The invention relates to apparatus for damping vibrations in power trains of motor vehicles, and more particularly to improvements in vibration damping apparatus of the type wherein a first flywheel is connectable to the internal combustion engine of the vehicle, a second flywheel is connectable with the input element of the variable-speed transmission of the vehicle (preferably by way of a friction clutch), and one or more dampers are arranged to operate between the first and second flywheels. As a rule, the dampers contain energy storing elements which react against the first flywheel and bear against a component which is substantially non-rotatably but axially movably connected with the second flywheel, for example, by way of a toothed coupling, and is mounted for angular movement relative to the first flywheel.

Commonly owned copending patent application Ser. No. 069,611 (filed Jul. 2, 1987 by Johann Jackel for "Apparatus for damping torsional vibrations" and now U.S. Pat. No. 4,946,420) discloses an apparatus wherein the damper means between the flywheels comprises energy storing means in the torm of coil springs which are installed in a chamber of one of the flywheels. The damper means further comprises a hydraulic damper. A component of the damper means resembles a flange and is installed between the flywheels with freedom of axial movement so as to compensate for the sum of tolerance of all parts of the apparatus as well as to establish with the adjacent parts an axial clearance (such clearance is necessary or desirable for proper operation of the hydraulic damper). The component can turn relative to the first flywheel and is connected with the second flywheel by means of a toothed coupling which permits the component to move axially of and between the two flywheels. It is necessary to ensure that the teeth of the coupling mate with a certain amount of play in order to compensate for manufacturing tolerances as well as to permit convenient assembly of the apparatus.

It has been found that, as the wear upon the two halves of the coupling progresses and the play between the teeth of such parts increases accordingly, the coupling generates excessive noise. In order to reduce the noise, a further prior proposal involves the utilization of rivets to fixedly secure the radially innermost portion of the component to the second flywheel. This necessitates an increase of clearances between the two sides of the component and the adjacent parts in order to avoid jamming of the damper. Excessive clearances between the component which is riveted to the second flywheel and the adjacent parts of the apparatus are undesirable for obvious reasons.

OBJECTS AND SUMMARY OF THE INVENTION

An object of the invention is to provide a vibration damping apparatus which avoids the drawbacks of the atorediscussed conventional apparatus in a simple and inexpensive way and generates less noise than heretofore known apparatus.

Another object of the invention is to provide an apparatus which is less prone to malfunction than conventional apparatus and whose operation is more reliable than that of apparatus which are presently used to damp vibrations between the engine and the variable-speed transmission of a motor vehicle.

A further object of the invention is to provide a simple, compact and inexpensive apparatus which can be installed in the power trains of existing motor vehicles as a superior substitute for presently used apparatus.

An additional object of the invention is to provide novel and improved damper means for use in the above outlined apparatus.

Still another object of the invention is to provide a novel and improved power train which embodies the above outlined apparatus and can be used between the internal combustion engine and the variable-speed transmission of a motor vehicle.

Another object of the invention is to provide the apparatus with novel and improved means for opposing angular movements of coaxial flywheels relative to each other when the flywheels are installed between the crankshaft of the engine and the input shaft of the variable-speed transmission in a motor vehicle.

An additional object of the invention is to provide novel and improved means for reducing noise in the above outlined apparatus.

A further object of the invention is to provide a novel and improved method of transmitting torque between the engine and the transmission of a motor vehicle.

The invention is embodied in an apparatus for damping vibrations in the power train between an internal combustion engine and a variable-speed transmission of a motor vehicle. The apparatus comprises a first rotary flywheel which is connectable to the crankshaft of the engine, a second rotary flywheel which is coaxial with the first flywheel and is connectable to the input shaft of the transmission, particularly by way of a friction clutch, and at least one damper which operates between the flywheels and includes a first component, a second component which is arranged to rotate with the second flywheel, and means for substantially non-rotatably coupling the first and second components to each other so that the first component is movable axially of the flywheels. At least one of the first and second components includes two substantially plate-like or disc-shaped sections which are biased relative to each other in the circumferential direction of the flywheels, and the at least one damper further comprises energy storing means reacting against the first flywheel and bearing against the first component.

The flywheels are turnable relative to each other to and from angular positions corresponding to a starting or idle position of the at least one damper. The coupling means comprises first coupling elements (e.g., in the form of teeth) which are provided on the first component, and complementary second coupling elements which are provided on the second component and mate with the first coupling elements. The arrangement is preferably such the first coupling elements bear against the second coupling elements in clockwise and counterclockwise directions, at least in the starting or idle position of the at least one damper.

In accordance with a presently preferred embodiment of the apparatus, the first component of the at least one damper comprises the aforementioned first and second plate-like or disc-shaped sections. The first and second sections can be at least substantially identical, and the first and second sections can (but need not always) be biased relative to each other by the energy storing means of the at least one damper. Those portions of the first coupling elements which are provided on one of the sections can be offset relative to the portions of first coupling elements on the other section, as seen in the circumferential direction of the flywheels.

The sections of the twin-section component can be provided with windows for the energy storing means and with surfaces which are disposed in the windows and bear against the energy storing means in response to angular movement of the flywheels relative to each other. The surfaces in the windows of one of the sections can be offset in the circumferential direction of the flywheels relative to the surfaces in the windows of the other section.

It is equally within the purview of the invention to provide additional energy storing means for biasing the sections of the twin-section component relative to each other. Each such section is formed with a window for the additional energy storing means, and the window of one of the sections can be angularly offset relative to the window of the other section, as seen in the circumferential direction of the flywheels.

The first coupling elements can mate with the second coupling elements of the coupling means with a predetermined play in the circumferential direction of the flywheels, and the windows for the additional energy storing means can be offset relative to each other through an angle which at least approximates the angle of movability of the first and second coupling elements relative to each other as a result of the aforementioned play.

Each of the energy storing means can comprise one or more coil springs, and the second component of the at least one damper can be riveted to the second flywheel. The first flywheel can be provided with an annular chamber for the energy storing means of the at least one damper and for one of the components. The apparatus can comprise a plurality of dampers including a first damper which is more distant from and a second damper which is nearer to the second component. The first component can constitute the output element of both dampers.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is an enlarged view of a detail within the phantom-line circle y in FIG. 2.

DESCRIPTION OF PREFERRED EMBODIMENTS

Figure 1:
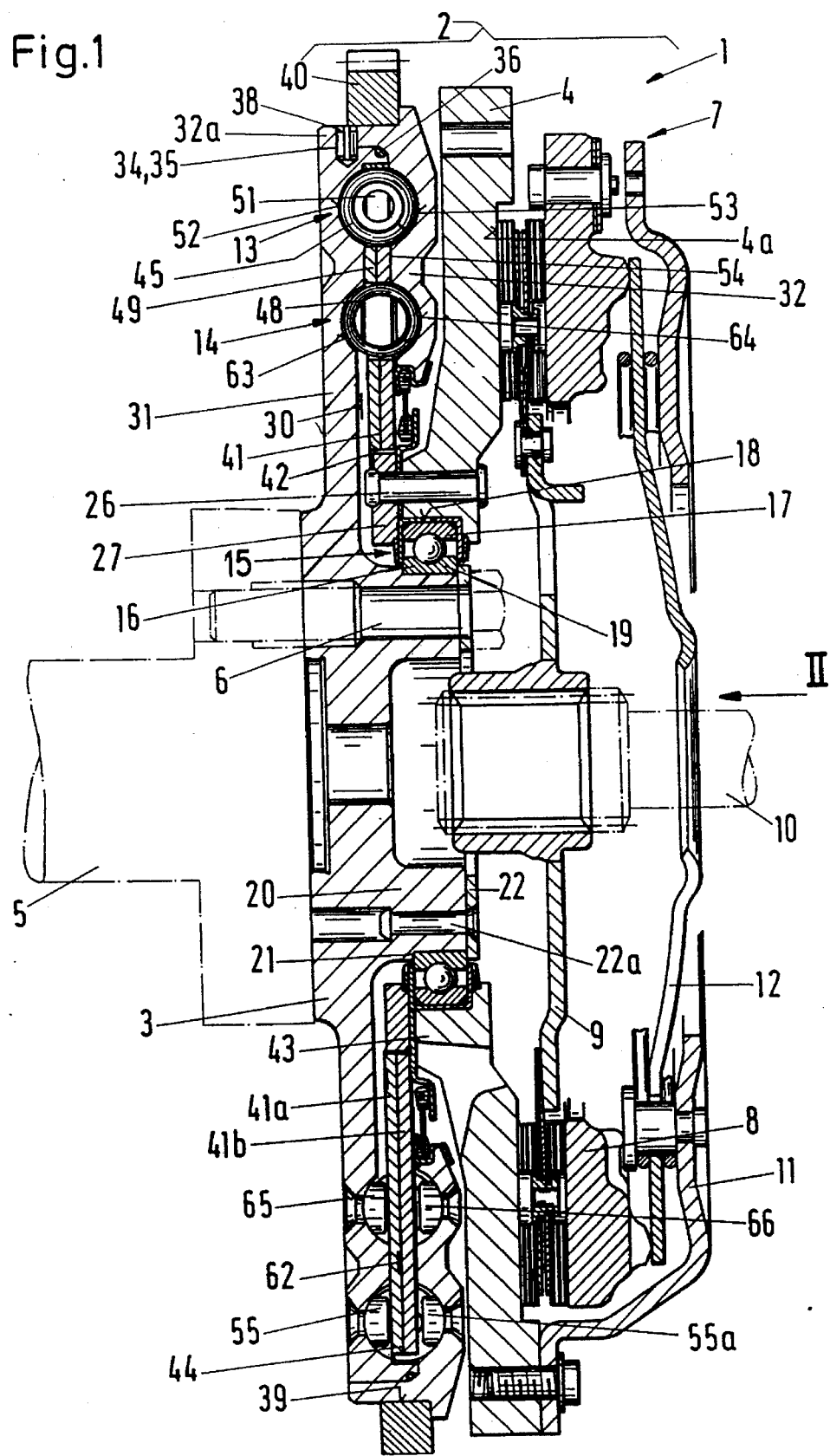
FIG. 1 is a central sectional view of an apparatus which embodies one form of the invention, the crankshaft of the engine and the input shaft of the variable-speed transmission being indicated by phantom lines.
Figure 1A:
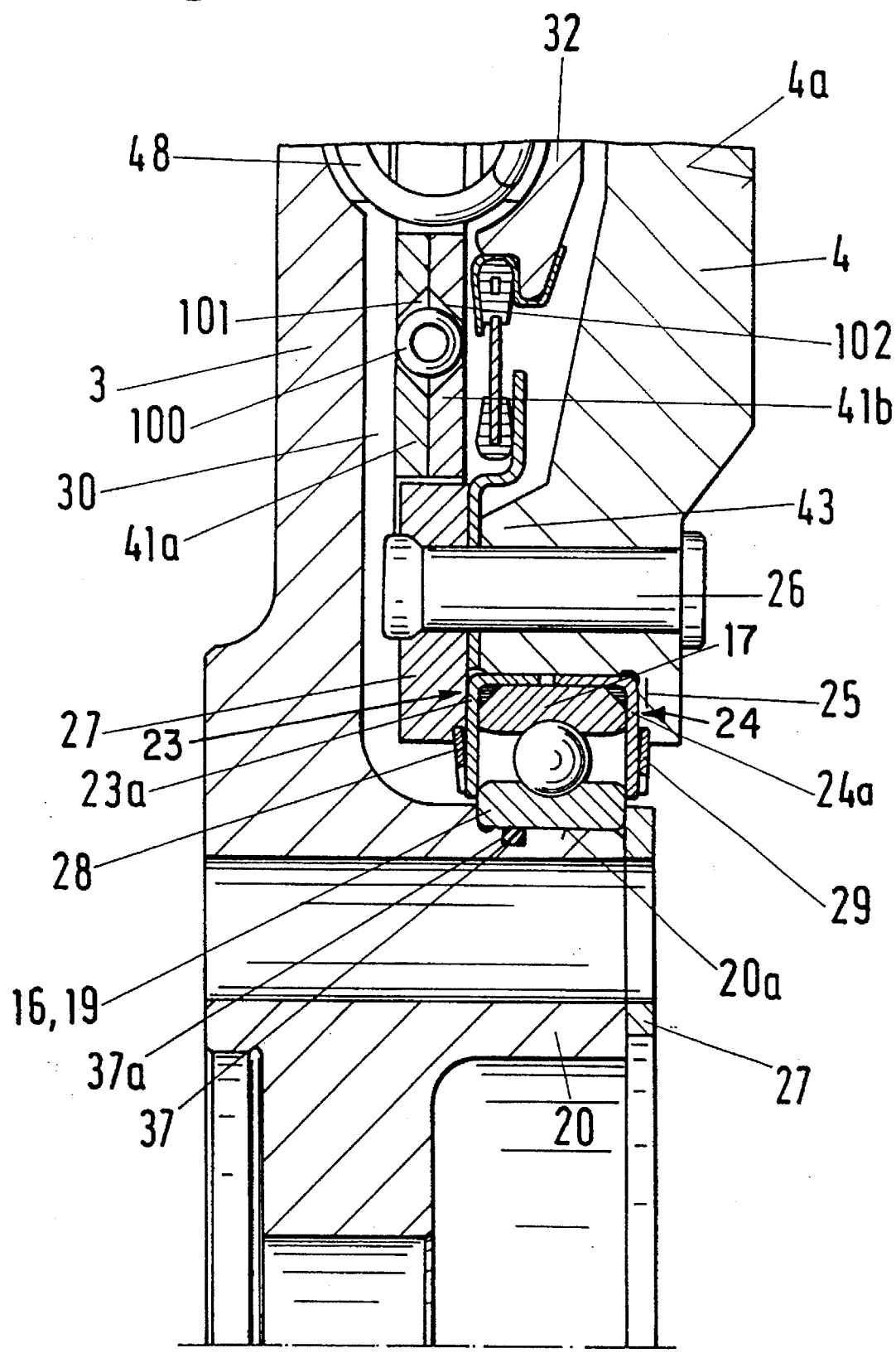
FIG. 1a is an enlarged view of a detail within the phantom-line 1 box x in FIG. 1.
Figure 2:
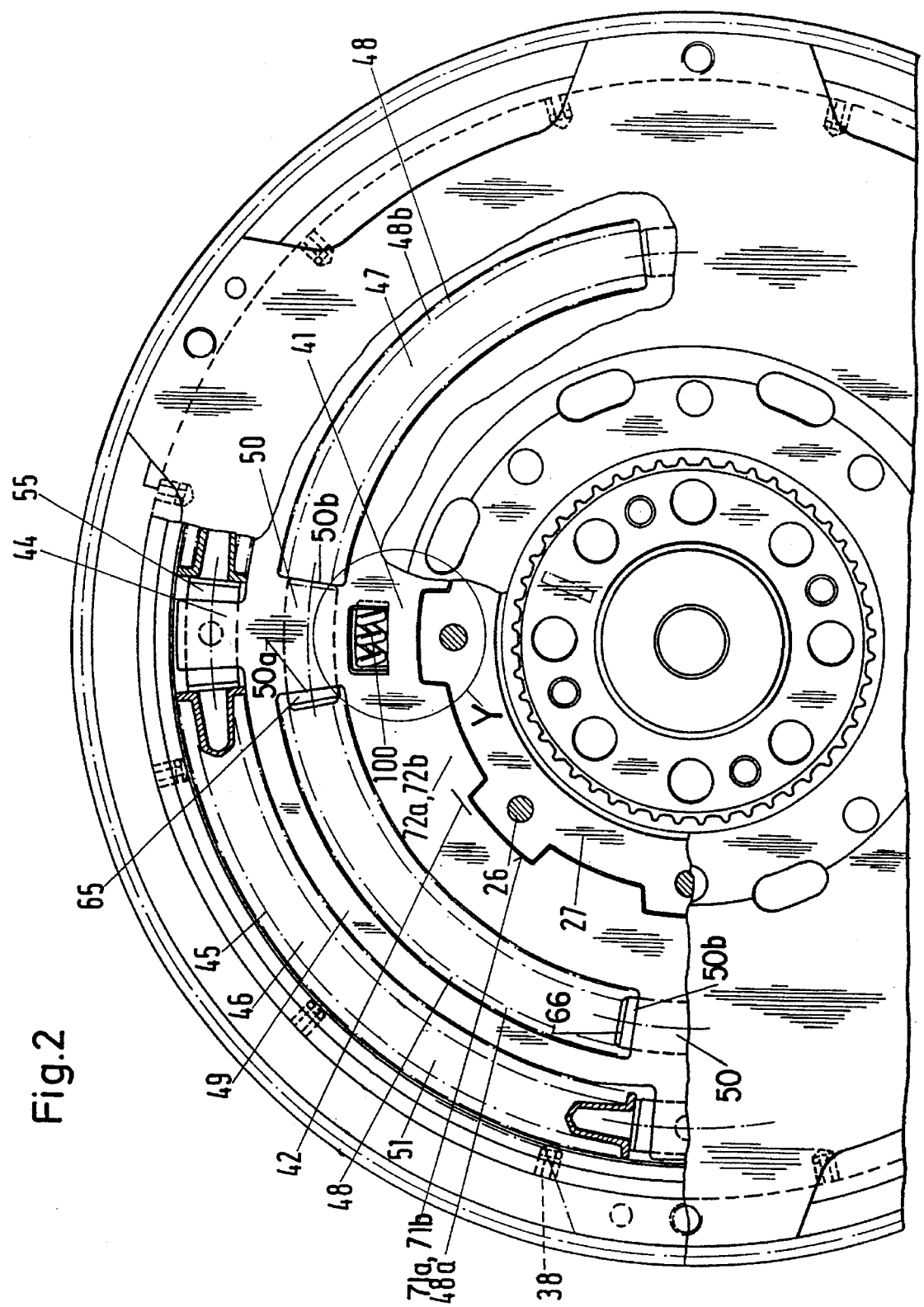
FIG. 2 is a fragmentary elevational view as seen in the direction of arrow II in FIG. 1, with the friction clutch omitted and with certain parts broken away.

Referring first to FIGS. 1, 1a and 2, there is shown an apparatus 1 which can be used in a motor vehicle to form part of, or to constitute, the power train between an internal combustion engine having a crankshaft 5, and a variable-speed transmission having an input shaft 10. The apparatus 1 serves to damp vibrations and includes a composite flywheel 2 having a first flywheel 3 connectable to the crankshaft 5 of the engine by a set of bolts 6 or other suitable fasteners, and a second flywheel 4 which is coaxial with the flywheel 3 and can drive the input shaft 10 of the transmission in response to engagement of a friction clutch 7. The latter comprises a pressure plate 8 which is non-rotatably but axially movably secured to a clutch cover 11 by a set of leaf springs (not shown) and is disposed between the cover and the flywheel 4. The friction linings of a clutch plate 9 are disposed between the pressure plate 8 and the flywheel 4, and the hub of the clutch plate 9 is non-rotatably but axially movably secured to the input shaft 10 of the transmission. The cover 11 of the friction clutch 7 carries two ring-shaped seats for a tiltable diaphragm spring 12 which normally biases the pressure plate 8 to the left (as seen in FIG. 1) so that the friction linings of the clutch plate 9 are clamped between the pressure plate 8 and the flywheel 4 and the input shaft 10 is compelled to share the angular movements of the flywheel 4. When the radially inwardly extending prongs of the diaphragm spring 12 are compelled to move toward the hub of the clutch plate 9, the friction clutch 7 is disengaged because the diaphragm spring allows the pressure plate 8 to move away from the flywheel 4 so that the latter is free to rotate relative to the input shaft 10.

The apparatus 1 further comprises a system of dampers including an outer damper 13 which is more distant from and a second damper 14 which is nearer to the common axis of the flywheels 3, 4. The dampers 13, 14 operate in parallel; their function is to permit but to yieldably oppose angular movements of the flywheels 3 and 4 relative to each other.

The flywheel 3 has a centrally located protuberance 20 which extends into a centrally located recess 18 of the flywheel 4. The annular space between the peripheral surface 20a of the protuberance 20 and the surface surrounding the recess 18 accommodates bearing means 15 including an antifriction ball bearing 16 with an outer race 17, an inner race 19 and a single row of spherical rolling elements between the two races. The inner race 19 is a press fit on the peripheral surface 20a of the protuberance 20 and is held against axial movement away from a shoulder 21 of the flywheel 3 by a washer-like retainer 22 abutting the end face of the protuberance 20 and being secured thereto by rivets 22a or in any other suitable way.

The outer race 17 of the antifriction bearing 16 is mounted in the recess 18 of the flywheel 4 between two ring-shaped members 23, 24 each of which has an L-shaped cross-sectional outline. The member 24 abuts an internal shoulder 25 of the flywheel 4 in the recess 18, and the member 23 abuts a ring-shaped component 27 which is fixedly secured to the flywheel 4 by rivets 26. The component 27 cooperates with the shoulder 25 and with the members 23, 24 to hold the outer race 19 of the bearing 16 against axial movement in the recess 18. The members 23, 24 jointly form a thermal barrier which prevents, or at least interferes with, the transfer of heat between the bearing 16 and that surface (4a) of the flywheel 4 which is adjacent the friction linings of the clutch plate 9 of the friction clutch 7.

The radially inwardly extending portions 23a, 24a of the members 23, 24 overlie the respective end faces of the outer race 17 and extend across the gap between the races 17, 19 into engagement with the respective end faces of the inner race 19. Thus, the radially extending portions 23a, 24a serve to seal the gap between the races 17, 19 and to confine therein a supply of lubricant for the rolling elements of the bearing 16. The radially innermost parts of the portions 23a, 24a are biased against the respective end races or the inner race 19 by discrete energy storing elements 28, 29 in the form of diaphragm springs to enhance the sealing engagement between the members 23, 24 and the inner race.

An elastic sealing ring 37 is installed in a circumferential groove 37a in the peripheral surface 20a of the protuberance 20 to prevent the escape of a preferably viscous fluid medium from an annular chamber 30 between two coaxial ring-shaped portions or walls 31, 32 of the flywheel 3. The wall 31 can be secured to the crankshaft 5 of the engine by the aforementioned fasteners 6, and the wall 32 has an axially extending collar 32a which overlies the peripheral surface 34 of the wall 31 and is secured thereto by a set of radially extending pins 38. The internal surface 35 of the collar 32a is immediately adjacent the peripheral surface 34 of the wall 31.

The walls 31, 32 of the flywheel 3 together form a ring-shaped housing which defines the aforementioned annular chamber 30. The dampers 13 and 14 of the apparatus 1 are installed in the chamber 30. The walls 31, 32 are castings, and the pins 38 which connect these castings to each other are held against movement radially outwardly from their bores or holes in the collar 32a and the adjacent radially outermost portion of the wall 31 by a ring-shaped starter gear 40 which surrounds the peripheral surface 39 of the collar 32a and overlies portions of or the entire radial bores of the collar. The surfaces 34, 35 cooperate to center the wall 32 on the wall 31. A circumferential groove in the surface 34 of the wall 31 receives an elastic sealing ring 36 which prevents the fluid medium from leaving the chamber 30 by flowing radially outwardly toward the internal surface 35 of the collar 32a.

If it is desirable or necessary to reduce the inertia of at least one of the flywheels 3, 4, the respective flywheel can be made of a light metal, such as an aluminum alloy. For example, at least one of the castings 31, 32 can be replaced with a machined or cast wall which is made of a light metal, such as an aluminum alloy. An advantage of flywheel portions which are made of an aluminum alloy or the like is that they can be extruded or formed in a press so that they do not require any or require only a minimum of secondary treatment prior to their assembly into a flywheel.

The dampers 13, 14 have a common output element 41 which is a radially extending ring-shaped flange-like component consisting of two preferably identical plate-like or disc-shaped sections 41a, 41b. The component 41 is disposed between the walls 31, 32 of the flywheel 3 radially outwardly of the component 27. A coupling 42 between the radially innermost portion of the component 41 and the radially outermost portion of the component 27 is constructed in such a way (see FIG. 2) that the component 41 is compelled to share all or nearly all angular movements of the component 27 and flywheel 4 but is free to move axially between the flywheels 3 and 4 to a certain extent which is determined by the width of the narrowest part of that portion of the chamber 30 into which the component 41 extends. The rivets 26 for the component 27 are anchored in that portion (43) of the flywheel 4 which surrounds the recess 18. The coupling 42 comprises bipartite tooth-shaped coupling elements with portions 72a, 72b which are respectively provided on the sections 41a, 41b of the component 41, and complementary tooth-shaped coupling elements 73 provided on the component 27 and mating with the adjacent coupling elements 72a+72b.

The component 27 can also comprise two identical or similar disc-shaped or plate like sections. Alternatively, the component 27 can comprise two disc-shaped or plate-like sections and the component 41 can constitute a one-piece flange extending radially outwardly from and being substantially non-rotatably but axially movably coupled to the twin-section component 27. At least one of the components 27, 41 can comprise more than two sections.

The sections 41a, 41b of the component 41 have radially outwardly extending projections in the form of arms 44 which alternate with circumferentially extending arcuate windows 46 for energy storing elements 45 of the outer damper 13. The energy storing elements 45 are coil springs. The windows 46 are disposed radially outwardly of arcuate webs 49 which separate the windows 46 from similar arcuate windows 47 for coil springs 48 which constitute the energy storing means of the inner damper 14. The arms 44 are located radially outwardly of similar arms 50 which are also integral parts of the sections 41a, 41b of the component 41 and are disposed between neighboring arcuate windows 47 for the coil springs 48.

The radially outermost portion 51 of the chamber 30 between the walls 31, 32 of the flywheel 3 constitutes a circumferentially complete annular compartment for the coil springs 45 of the outer damper 13. The arms 44 of the component 41 extend into the adjacent portions of the compartment 51 between the end convolutions of the neighboring coil springs 45. The compartment 51 is formed in part by two circumferentially complete grooves 52, 53 which are respectively provided in the inner sides of the walls 31, 32 of the flywheel 3. Each coil spring 45 has a central portion in the respective windows 46 of the sections 41a, 41b, a first lateral portion in the groove 52, and a second lateral portion in the groove 53. The radially innermost portion of the compartment 51 is substantially sealed from a similar annular compartment for the coil springs 48 of the inner damper 14 by the webs 49 of the sections 41a, 41b save for a narrow annular clearance 54 which is provided between the section 41b and the wall 32 or between the section 41a and the wall 31 or includes two parts, one between the section 41a and wall 31 and the other between the section 41b and wall 32.

FIG. 1 shows that the surfaces bounding the grooves 52, 53 in the walls 31, 32 of the flywheel 3 are configurated with a view to closely follow the outlines of adjacent portions of the coil springs 45. Thus, the convolutions of the coil springs 45 are received in the compartment 51 with minimal play and are or can be actually guided by the surfaces bounding the grooves 52, 53. Such close conformance of the surfaces bounding the grooves 52, 53 to the outlines of the coil springs 45 renders it possible to greatly reduce the wear upon the walls 31, 32 of the flywheel 3, upon the component 41 as well as upon the coil springs 45. More specifically, the wear which develops as a result of friction is more uniformly distributed because the walls 31, 32 of the flywheel 3 are in large-area contact with the coil springs 45.

The walls 31, 32 of the flywheel 3 carry abutments 55, 55a which extend into the compartment 51 and are engaged by the end convolutions of the adjacent coil springs 45. This enables these coil springs to react against the flywheel 3 and to bear against the surfaces at the ends of the respective windows 46 in the sections 41a, 41b of the component 41. The abutments 55, 55a can constitute the heads of rivets (see FIG. 1) which are anchored in the respective walls 31, 32 of the flywheel 3. The heads of these rivets extend into the compartment 51 to such an extent that they can be engaged by the adjacent portions of end convolutions of the coil springs 45 but that they cannot interfere with movements of arms 44 on the sections 41a, 41b of the component 41 in the circumferential direction of the flywheel 3.

FIG. 2 shows that the length of the abutments 55 and 55a (only one of the abutments 55 is fully shown) in the circumferential direction of the flywheel 3 exceeds the corresponding dimensions of the arms 44. When the damper 13 assumes its neutral or idle position of FIG. 2, the corresponding projections 55, 55a extend to the same extent beyond the edge faces of the adjacent arms 44. The length of each projection 55a preferably matches the length of the adjacent projection 55.

The aforementioned clearance or clearances 54 form part of a gap 62 which is defined by the wheels 31, 32 of the flywheel 3 radially inwardly of the coil springs 45, i.e., between the compartment 51 and a similar compartment including two mirror symmetrical grooves 63, 64 provided in the walls 31, 32 for the adjacent portions of the coil springs 48. The manner in which the surfaces bounding the grooves 63, 64 closely follow the outlines of the adjacent portions of coil springs 48 is preferably the same as described above in connection with the coil springs 45 and the surfaces bounding the grooves 52, 53. The walls 31, 32 of the flywheel 3 carry projections 65, 66 which engage the adjacent portions of the end convolutions of neighboring coil springs 48 while permitting the arms 50 of the sections 41a, 41b to move between them in the circumferential direction of the flywheel 3.

The length of the projections 65, 66 in the circumferential direction of the flywheel 3 exceeds the corresponding dimensions of neighboring arms 50 and of the component 41. When the dampers 13, 14 assume the neutral or idle positions of FIG. 2, the radially extending edge faces of the arms 50 are not located at the same distance from the respective abutments 65, 66. As can be seen in the central portion of FIG. 2, the abutment 65 is spaced apart from the left-hand edge face 50a but the corresponding abutment 66 is immediately adjacent the right-hand edge face 50b of the corresponding arm 50 of the component 41. On the other hand, the left-hand projection 66 is spaced apart from the edge face 55b while the left-hand projection 65 (not visible) is immediately adjacent the edge face 50a of the respective arm 50. Thus, successive pairs of projections 65, 66 (as seen in the circumferential direction of the flywheel 3) are staggered with reference to the adjacent arms 50 in opposite directions (clockwise and counterclockwise). This results in the formation of two groups (48a, 48b) of coil springs 48 which become effective during different stages of angular movement of the flywheels 3, 4 relative to each other.

As mentioned above, the section 41a can be identical with the section 41b of the component 41. This can be readily seen in FIGS. 2 and 3. The coupling element portions 72a, 72b of the sections 41a, 41b respectively alternate with tooth spaces 71a, 71b. These tooth spaces receive the complementary tooth-shaped coupling elements 73 at the periphery of the component 27.

As can be seen in FIGS. 1a and 3, the sections 41a, 41b of the component 41 are respectively provided with partially registering windows 101, 102 for additional energy storing means including a coil spring 100 which serves to bias the sections 41a, 41b relative to each other in the circumferential direction of the flywheel 3 so that each coupling element portion 72a of the section 41a abuts one side and each coupling element portion 72b of the section 41b abuts the other side of the respective coupling element 73. The window 102 of FIG. 3 (in the section 41b) is assumed to be located in front of the window 101 in the section 41a; therefore, the outline of the window 102 is shown by heavier lines. The left-hand end convolution of the coil spring 100 which is shown in FIG. 3 acts upon the adjacent radially extending surface 101a in the window 101 of the section 41a, and the right-hand end convolution of the coil spring 100 bears against the radially extending surface 102a in the window 102 of the section 41b. The surfaces 101a, 102a at both ends of the windows 101, 102 are offset relative to each other in the circumferential direction of the flywheel 3 so as to ensure that the coil spring 100 can maintain the coupling element portions 72a, 72b in abutment with the adjacent coupling elements 73 of the component 27. In other words, the coil spring 100 (which is installed in prestressed condition) tends to turn the sections 41a, 41b in opposite directions so that each coupling element 73 is clamped between a coupling element portion 72a forming part of the section 41a and a coupling element portion 72b forming part of the section 41b. In FIG. 3, the coil spring 100 biases the section 41b and its window 102 in a clockwise direction while the section 41a and its window 101 are biased in a counterclockwise direction. This ensures that the coupling element portion 72b of the section 41b is biased against the adjacent edge face of the neighboring coupling element 73 while the coupling element portion 72a of the section 41a is biased against the left-hand edge face of the same coupling element 73.

The extent to which the coupling element portions 72a, 72b are offset relative to each other in the circumferential direction of the flywheel 3 is exaggerated in FIG. 3 for the sake of clarity. As a rule, the extent of such offset is or can be smaller or even much smaller, i.e., the coupling element portions 72a of the section 41a can practically fully overlap the coupling element portions 72b of the section 41b. The extent to which the windows 101, 102 of the sections 41a, 41b are out of register is at least proportional to the extent of angular offset of the coupling element portions 72a and 72b. It is important to ensure that the coil spring or springs 100 can maintain the flanks of each coupling element 73 in engagement with a pair of coupling element portions 72a, 72b, at least when the dampers 13, 14 assume the neutral positions of FIG. 2 and the engine operates under no load or under partial load.

If the coil spring 100 is designed to eliminate play between the coupling elements 73 and the composite coupling elements 72a+72b, i.e., if the coupling 42 establishes between the components 27, 41 a torque-transmitting connection which is at least substantially free of play in the circumferential direction of the flywheel 3, the windows 46 and 47 in the section 41a can exactly match and exactly register with the windows 46, 47 in the section 41b. In other words, the radially extending surfaces at the ends of the windows 46, 47 in the section 41a can be exactly aligned with the surfaces at the ends of the corresponding windows 46, 47 in the section 41b.

An advantage of the improved apparatus 1 is that the component 41 with its identical or practically identical sections 41a, 41b (which are biased relative to each other in the circumferential direction of the flywheel 3) simplifies the assembly of the apparatus and the component 41 contributes to a reduction of noise when the apparatus is in use. Moreover, the wear upon the parts of the apparatus, especially upon the coupling 42, is less pronounced, and this contributes to longer useful life of the entire apparatus. The reasons for less pronounced wear upon and for longer useful life of the coupling 42 are as follows: A connection which is of the form-locking type (e.g., a connection by means of gears wherein the teeth of one gear mate with the teeth of one or more other gears) is likely to permit repeated striking of neighboring parts (such as teeth) against each other in response to fluctuations of torque. The resulting stresses can reach such a magnitude that the strength of the material of such parts does not suffice to withstand the stresses so that the material begins to flow in the regions adjacent the surfaces of the parts, i.e., the parts undergo permanent deformation. This increases the play and hence the force of repeated impacts of the deformed parts against each other.

The improved coupling is not likely to undergo such deformation and is therefore less likely to generate much noise and/or to break down after a relatively short interval of use. In addition, and since the coil spring 100 compensates for manufacturing tolerances of a number of parts in the apparatus 1, such parts can be mass-produced at a lower cost because they need not be machined and/or otherwise formed with a very high degree of precision. The coupling 42 enables the component 41 to find an optimum position between the walls 31, 32 of the flywheel 3 so that the clearance 54 in the portion 62 of the chamber 30 can be reduced and kept to a minimum.

It is clear that the improved apparatus can comprise two or more coil springs 100 which serve to bias the sections 41a, 41b of the twin-section component 41 relative to each other in the circumferential direction of the flywheel 3. Furthermore, it is possible to operate without the coil spring or coil springs 100 by the simple expedient of employing one of the damper springs (45, 48) as a means for biasing the sections 41a, 41b relative to each other. For example, at least one of the coil springs 48 (note the right-hand coil spring (of the set 48b) in FIG. 2) can be mounted in its windows 47 (provided in the sections 41a and 41b) in the same way as described for the coil spring 100 and windows 101, 102 of FIG. 3 so that it tends to turn one of the sections 41a, 41b in a clockwise direction while simultaneously urging the other of these sections in a counterclockwise direction when the parts of the apparatus 1 including its dampers 13, 14 assume the starting or idle positions of FIG. 2. This can be achieved by staggering the windows 46, 47 in the section 41a relative to the windows 46, 47 in the section 41b or by staggering the coupling element positions 72a relative to the adjacent coupling element positions 72b.

It is presently preferred to bias the sections 41a, 41b relative to each other by one or more additional coil springs (such as the coil spring 100 of FIG. 3) because this renders it possible to design the sections 41a, 41b and their windows 46, 47 in such a way that both sections are biased by the coil springs 45, 48 to the same extent. However, and as explained above, it is possible to dispense with the additional spring or springs 100 and to employ one of the springs 45, 48 to perform such function. This contributes to simplicity of the sections 41a, 41b, to a reduction of the overall number of component parts and hence to lower cost of the improved apparatus.

Apparatus embodying certain elements or combinations of elements shown in the drawing of the present application are described and shown in numerous United States and foreign patent applications and patents of the assignee of the present application.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for damping vibrations in the power train between an engine and a transmission of a motor vehicle, comprising a first rotary flywheel connectable with the engine; a second rotary flywheel connectable with the transmission; and at least one damper operating between said flywheels and including a first component, the apparatus further comprising a second component coaxial with said first component and arranged to rotate with said second flywheel and said at least one damper further including means for substantially non-rotatably coupling said coaxial components so that said first component is movable axially of said flywheels, at least one of said components including two substantially plate-like sections which are biased relative to each other in the circumferential direction of said flywheels, and said at least one damper also including energy storing means reacting against said first flywheel and bearing against said first component, said flywheels being turnable relative to each other to and from angular positions corresponding to a starting position of said at least one damper, said coupling means comprising first coupling elements provided on said first component and complementary second coupling elements provided on said second component and mating with said first coupling elements, said first coupling elements bearing against said second coupling elements in clockwise and counterclockwise directions, at least in the starting position of said at least one damper.

2. The apparatus of claim 1, wherein said one component is said first component.

3. The apparatus of claim 1, wherein said sections are at least substantially identical.

4. The apparatus of claim 1, wherein said first coupling elements have first portions on one of said sections and second portions on the other of said sections, said first portions being offset relative to said second portions in the circumferential direction of said flywheels.

5. The apparatus of claim 1, wherein said one component is said first component and said sections of said first component have windows for said energy storing means and surfaces provided in said windows and bearing against the energy storing means in response to angular movement of said flywheels relative to each other, the surfaces in the windows of one of said sections being offset relative to the surfaces in the windows of the other of said sections in the circumferential direction of said flywheels.

6. The apparatus of claim 1, further comprising additional energy storing means for biasing said sections relative to each other.

7. The apparatus of claim 6, wherein each of said sections has a window for said additional energy storing means, the window of one of said sections being angularly offset relative to the window of the other of said sections in the circumferential direction of said flywheels.

8. The apparatus of claim 9, wherein said second coupling elements mate with said first coupling elements with a predetermined play in the circumferential direction of said flywheels, said windows being offset relative to each other through an angle which at least approximates the angle of movability of said first and second coupling elements relative to each other as a result of said predetermined play.

9. The apparatus of claim 1, wherein said energy storing means includes coil springs and said second component is riveted to said flywheel.

10. The apparatus of claim 1, wherein said first flywheel has an annular chamber for said energy storing means and one of said components.

11. The apparatus of claim 1, comprising a plurality of dampers including a first damper remote from and second damper nearer to said second component.

* * * * *